(12) United States Patent
Christ et al.

(10) Patent No.: US 8,171,984 B2
(45) Date of Patent: May 8, 2012

(54) LATENT HEAT STORAGE DEVICES

(75) Inventors: Martin U. Christ, Wehringen (DE);
Oswin H. Ottinger, Meitingen (DE);
Wolf-Dieter Steinmann, Boblingen (DE)

(73) Assignee: SGL Carbon AG, Rheingaustrasse (DE)

( * ) Notice: Subject to any disclaimer, the term of this patent is extended or adjusted under 35 U.S.C. 154(b) by 1302 days.

(21) Appl. No.: 11/345,861

(22) Filed: Feb. 1, 2006

(65) Prior Publication Data
US 2007/0175609 A1  Aug. 2, 2007

(51) Int. Cl.
*F28D 17/00* (2006.01)
*F28D 7/00* (2006.01)

(52) U.S. Cl. .......................... 165/10; 165/80.3; 165/185

(58) Field of Classification Search .................... 165/10, 165/104.11, 104.17, 104.21, 185, 80.3, 905
See application file for complete search history.

(56) References Cited

U.S. PATENT DOCUMENTS

| | | | |
|---|---|---|---|
| 3,404,061 A | 10/1968 | Shane et al. | |
| 3,769,674 A * | 11/1973 | Droughton et al. | 29/890.032 |
| 4,895,713 A | 1/1990 | Greinke et al. | |
| 5,765,838 A * | 6/1998 | Ueda et al. | 277/650 |
| 6,027,807 A * | 2/2000 | Inoue et al. | 428/408 |
| 6,097,598 A * | 8/2000 | Miyahara et al. | 361/704 |
| 6,482,332 B1 * | 11/2002 | Malach | 252/70 |
| 6,645,456 B2 | 11/2003 | Ottinger et al. | |
| 7,303,005 B2 * | 12/2007 | Reis et al. | 165/185 |
| 2002/0016505 A1 | 2/2002 | Gally et al. | |
| 2002/0033247 A1 | 3/2002 | Neuschutz et al. | |
| 2002/0060063 A1 | 5/2002 | Neuschutz et al. | |
| 2003/0183379 A1 * | 10/2003 | Krassowski et al. | 165/185 |
| 2004/0084658 A1 * | 5/2004 | Ottinger et al. | 252/500 |
| 2004/0118553 A1 * | 6/2004 | Krassowski et al. | 165/104.26 |
| 2004/0206941 A1 * | 10/2004 | Gurin | 252/500 |
| 2005/0007740 A1 | 1/2005 | Neuschuetz et al. | |
| 2005/0258394 A1 | 11/2005 | Bacher et al. | |

FOREIGN PATENT DOCUMENTS

| | | |
|---|---|---|
| DE | 100 36 777 A1 | 2/2002 |
| EP | 0 914 399 B1 | 11/2000 |
| EP | 1 371 915 A2 | 12/2003 |
| EP | 1 455 156 A2 | 9/2004 |
| WO | WO 03/102484 A2 | 12/2003 |

\* cited by examiner

*Primary Examiner* — Tho V Duong
(74) *Attorney, Agent, or Firm* — Taylor IP, P.C.

(57) ABSTRACT

A latent heat storage device including a vessel, a phase change material disposed within the vessel, at least one heat exchange interface in contact with the phase change material, at least one sheet of graphite foil which extends within the bulk of the phase change material.

18 Claims, 8 Drawing Sheets

FIG. 8

LATENT HEAT STORAGE DEVICES

FIELD

Latent heat storage devices.

BACKGROUND

Phase change materials (PCM) are capable of storing heat energy in the form of latent heat. Such materials undergo a phase transition when heat is supplied or removed, e.g., a transition from the solid to the liquid phase (melting) or from the liquid to the solid phase (solidification) or a transition between a low-temperature and high-temperature modification or between a hydrated and a de-hydrated modification or between different liquid modifications. If heat is supplied to or removed from a phase change material, on reaching the phase transition point the temperature remains constant until the material is completely transformed. The heat supplied or released during the phase transition, which causes no temperature change in the material, is known as latent heat.

Phase change materials can be used to store latent heat in a latent heat storage device. The device is charged by transfer of heat (thermal energy) from a medium which releases heat across an interface into the phase change material where the heat is stored, and discharged by transfer of heat from the phase change material across the interface to a medium which is heated. The medium from/to which heat is transferred can be, for example, water or steam, air, helium or nitrogen. The heat exchange interface can consist, for example, of the walls of heat exchange tubes passed through by a medium from/to which heat is transferred, or of heat exchanger plates over which a medium flows from/to which heat is transferred.

Unfortunately, the thermal conductivity of most phase change materials is rather low (in the range between 0.2 W/m*K and 1.0 W/m*K). As a consequence, the charging and discharging of a latent heat storage device are relatively slow processes. Therefore, in order to reduce the distance over which heat must be transferred within the bulk of the phase change material, the thickness of the layer of phase change material adjacent to the heat exchange interface tends to be minimized. For example, when heat is transferred from or to the phase change material via heat exchange tubes, a small distance between the tubes is necessary in order to reduce the thickness of the PCM layer through which heat has to be transferred from/to the tubes. A representative distance between tubes having a tube diameter of 10 to 50 millimeters (mm) may be on the order of 50 to 80 mm. Due to the requirement of a small distance between the tubes, the number of tubes needed for a heat storage device of a given capacity becomes quite large. This is very disadvantageous for technical and economical reasons, because the large number of tubes makes the device difficult to manufacture and handle, and expensive.

The problem of the low thermal conductivity of phase change materials can be overcome by providing a latent heat storage composite wherein the phase change material is combined with an auxiliary component with high thermal conductivity, e.g., graphite.

U.S. Publication No. 2004-084658 discloses a heat storage device using a latent heat storage composite comprising a phase change material and a volume fraction of 5 to 40% of expanded graphite particles. A bulk bed of the latent heat storage composite is introduced into a latent heat storage vessel interspersed with heat exchanger profiles.

Throughout the latent heat storage composite, the graphite particles are distributed substantially homogeneously. Hence there is no prevailing directional orientation of the heat conduction. However, a preferred conduction of heat in the direction to/from the interface where the heat exchange occurs is desired in order to enhance the charge or discharge of the latent heat storage device.

SUMMARY

In one embodiment, the invention relates to a latent heat storage device with at least one sheet of graphite foil disposed within the bulk of the phase change material, with the phase change material being surrounded by a vessel and being in contact with heat exchange interfaces. The latent heat storage device may provide directionally oriented heat conduction within the bulk of the phase change material and/or locally enhanced thermal conductivity within the bulk of the phase change material.

Graphite foil is characterized by a pronounced anisotropy of the thermal conductivity. The specific thermal conductivity parallel to the plane of the foil is by a factor of 20 to 100 higher than the specific thermal conductivity perpendicular to the plane of the foil. Thus graphite foil is very qualified for the directional transfer of heat. The volume fraction of the at least one sheet of graphite foil within the overall volume of graphite foil and phase change material in the heat storage device may be therefore kept rather low. A representative volume fraction of the at least one sheet of graphite foil within the overall volume of graphite foil and phase change material in the heat storage device is at most 20%, and in another embodiment, below 10%.

Within the heat storage device according to an embodiment of the invention, the sheet of graphite foil can be fastened at the heat exchange interfaces; e.g., at the heat exchange tubes or plates. In this embodiment, the sheet of graphite foil is arranged angular to the heat exchange interface. Angular arrangement in this context means that the angle between the heat exchange interface and a sheet of graphite foil is different from zero, i.e., that the sheet is not in parallel orientation to the heat exchange interface, but, relative to the interface, project into the bulk of the phase change material. According to a one embodiment, the at least one sheet is oriented perpendicularly to the heat exchange interface.

Due to this arrangement of sheets of graphite foil, the transfer of heat from the heat exchange interface to the bulk of the phase change material or vice versa is facilitated by the thermal conductivity parallel to the plane of the graphite foil. Within the phase change material itself, heat has to be transferred only along the short distance of the half thickness of the layer of phase change material in the vicinity of the sheet of graphite foil. In this way, heat transfer within the bulk of the phase change material is facilitated very effectively although the volume fraction of the sheet of graphite foil within the overall volume available for heat storage is quite small. More specifically the volume fraction of the at least one sheet of graphite foil within the overall volume of graphite foil and phase change material can be limited to at most 20%, preferably below 10%.

According to another embodiment of the invention, the at least one sheet of graphite foil can be disposed so that the at least one sheet protrudes into the bulk of the phase change material without being in direct mechanical connection to the heat exchange interface. This arrangement is useful in facilitating the heat conduction in such regions of the phase change material which are rather remote from the heat exchange interface. On the other hand, in the vicinity of the heat exchange interface, the heat transfer within the phase change material is less critical, because of the short distance to the heat exchange interface. A sheet of graphite foil that is not in contact with the heat exchange interface can be fastened to the inner wall of the vessel surrounding the phase change material.

Of course both variants can be combined so that the heat storage device is provided, for example, with a plurality of first sheets of graphite foil which are in contact with a heat exchange interface and project into the bulk of the phase change material and a plurality of second sheets of graphite foil which extend within the bulk of the phase change material remote from the heat exchange interfaces.

In various embodiments, sheets of graphite foil can be of planar geometry. Sheets of graphite foil can also be folded in a zig-zag manner or corrugated in a similar manner like a corrugated sheet iron. Alternatively, a plurality of graphite sheets can be combined to form non-planar arrangements extending into the bulk of the phase change material. For instance, a plurality of sheets of graphite foil can be arranged in a zig-zag chain. To stabilize the corrugated or zig-zag shape of the sheets of graphite foil, reinforcement elements could be used e.g., flanged or crimped metal or plastic stripes along the edges of the sheets of graphite foil.

In a further preferred embodiment, the sheets of graphite foil are provided with perforations allowing flow-through of the molten phase change material. In this way, mechanical tensions arising from a sudden volume increase upon melting of the phase change material are reduced or avoided.

Sheets of graphite foil can be provided with a structure comprising projecting areas like knobs or buckles on at least one surface. Such projections act as spacers and prevent slipping of the sheets onto each other when the phase change material is in the liquid state. In contrast, due to the spacing action of the projections, there is always left certain space between adjacent sheets which can accommodate the phase change material. In one embodiment, a ratio between the thickness of the projecting areas and the thickness of the non-projecting areas of the foil is between 20:1 and 5:1. The area of the projections has to be kept small because the space occupied by the projections is not available for the phase change material. Graphite foil with such a surface structure can be prepared by application of a calendar roll with a suitable profile.

According to one embodiment of the invention, composites comprising sheets of graphite foil and a phase change material are prefabricated and disposed within the heat storage device. Especially preferred are laminates (layered composites) formed of a sheet of graphite foil and a layer of a phase change material.

Such composites can be obtained by casting the liquid phase change material onto the surface of sheets of graphite foil or around sheets of graphite foil and allowing the phase change material to solidify. The space around the sheet of graphite foil which has to be filled with the phase change material is defined by a mold or other suitable means. At least one sheet of graphite foil is disposed within the mold.

Transfer of the phase change material into the liquid state is achieved, e.g., by melting or by dissolution in a suitable solvent, which afterwards is evaporated from the composite. The phase change material can be applied in such an amount that within the composite, the volume fraction of the sheet of graphite foil is at most 20%, preferably below 10%. An advantage of this embodiment is that due to the prefabrication of the composites, no hot liquid phase change material has to be handled during assembly of the latent heat storage device.

The preparation of graphite foil is known in the art, such as from U.S. Pat. No. 3,404,061. To produce expanded graphite, graphite-intercalation compounds or graphite salts, for example graphite hydrogen sulfate or graphite nitrate, are heated in a shock-like manner to a temperature between 800° C. and 1,000° C. Thereupon, the intercalated agents are released and the volume of the graphite particles is increased by a factor between 200 and 400. This increase in volume corresponds to a drop of the bulk density from between 600 and 700 grams per cubic centimeter ($g/cm^3$) which is typical for the graphite salt, to about 2 to 7 grams per liter (g/l).

The expanded graphite consists of vermiform or concertina-shaped aggregates. If the expanded graphite is compacted under the directional action of pressure, the layer planes of the graphite preferably align perpendicularly to the direction of the action of pressure, with the individual aggregates hooking up with each other. As a result, planar foil-like structures ("graphite foil") can be produced that are self-supporting without the addition of any binder. In this way, graphite foil with a thickness between 0.1 and three (3) millimeters (mm) and an area weight between 100 and 3,000 grams per square centimeter ($g/cm^2$) can be made. The thermal conductivity in the direction parallel to the plane of the foil is between 70 and 500 Watts per meter Kelvin (W/m*K), while the thermal conductivity perpendicular to the plane of the foil is only between 3 and 6 W/m*K. The thermal anisotropy tends to be more pronounced the higher the density of the foil, because stronger compression leads to a more pronounced alignment of the basal planes.

In one embodiment, a latent heat storage device may include one or more of sheets graphite foil (e.g., one or more sheets of graphite foil) each having a thickness in the range between 0.1 and 3 mm, density in the range between 0.5 and 1.9 $g/cm^3$ and in-plane thermal conductivity of at least 70 W/m*K.

Another feature of graphite foil which is advantageous for the invention is its resistance against chemical attacks and corrosion. Graphite foil tends to be resistant to organic solvents, salts and solutions of salts, non-oxidizing acids and bases.

Any phase-change material that is inert with respect to graphite in the working temperature range can be used in the latent heat storage device according to embodiments of the invention. The invention allows the use of various types of phase-change materials, even those which are corrosive to metals, e.g., chloride salts.

The phase change material can reside in a transition between the liquid and solid phase or in a transition between different solid or liquid phases. In one embodiment, the phase transition temperatures of suitable phase-change materials are in the range from −100° C. to +500° C. At phase transition temperatures above 500° C., increased care must be taken to protect the graphite against oxidative attack from ambient oxygen.

Suitable phase change materials are, for example, paraffin, sugar alcohols, polymers, in particular thermoplastic polymers, water, organic acids like fatty acids or other organic acids like capric acid, lauric acid, myristic acid, palmitic acid and stearic acid and their mixtures, aqueous solutions of salts, salt hydrates, mixtures of salt hydrates, inorganic and organic salts and eutectic blends of salts, chlathrate hydrates and alkali metal hydroxides. Typical examples for polymers suitable as phase change materials are polyethylene, polypropylene, polyamides, polycarbonates, polyimides, poly(butadiene), poly(isoprene), poly(hydrogenated butadiene), polyetherester elastomers, ethylene/propylene/diene (EPDM) polystyrene and polyvinyl chloride. Examples for salts and salt hydrates suitable as phase change materials include ammonium and alkali and alkali earth metal salts like chlorides, chlorates, nitrates, nitrides, sulfides, phosphates, hydroxides, carbonates, fluorides, bromides, acetates, acetamides and perborates of magnesium, sodium, potassium, calcium, lithium, barium and their hydrates. Typical representatives for salts and salt hydrates utilizable as phase change materials are e.g., potassium nitrate, sodium nitrate, lithium nitrate, sodium chloride, calcium chloride, lithium chlorate, and their mixtures or calcium chloride hexahydrate, magnesium chloride hexahydrate, lithium nitrate trihydrate and sodium acetate trihydrate. Representatives of sugar alcohols are e.g., pentaerythritol, trimethylolethane, erythritol, mannitol, neopentyl glycol and their mixtures. The list contains examples only and is by no means restricting.

The heat exchange interfaces (tubes, plates etc.) used in an embodiment of the heat storage device can be made e.g., from metal, graphite, graphite-containing composite materials or ceramics. The choice of the material depends on conditions such as the working temperature and the corrosiveness of the phase change material and the medium to and from which heat has to be transferred.

DETAILED DESCRIPTION

Figure 1A:
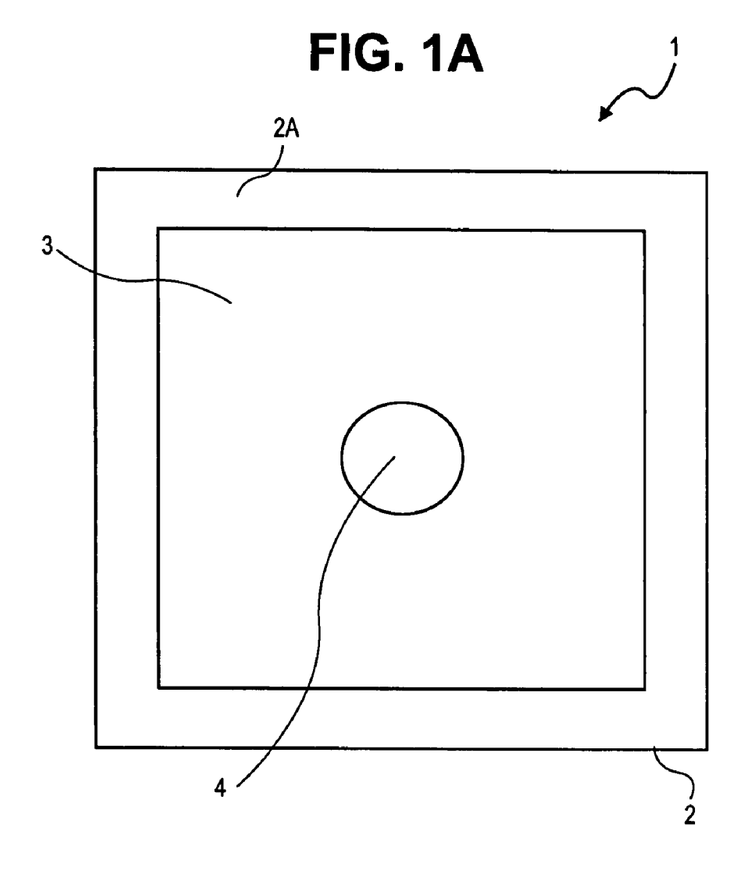
FIG. 1A is a plane view of a prefabricated latent heat storage laminate.
Figure 1B:
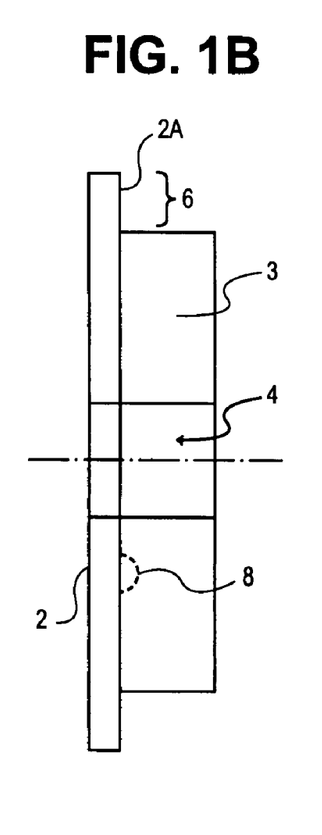
FIG. 1B is a side view of the prefabricated latent heat storage laminate of FIG. 1A.

FIG. 1A and FIG. 1B show a front view and a side view, respectively, of a layered composite (laminate) 1 including sheet 2 of graphite foil and layer 3 of a phase change material (PCM) in a solid state. In the center of the laminate, there is provided a through-hole 4, allowing laminate 1 to be arranged on a heat exchange tube.

In the embodiment shown in FIG. 1A and FIG. 1B, the surface area of sheet 2 of graphite foil is larger than the surface area of layer 3 of phase change material (PCM) in the solid state. FIG. 1A shows laminate 1 as a rectangle with sheet 2 of graphite foil having a larger surface area than a surface area of layer 3 of phase change material. A representative dimension of laminate 1 is sheet 2 of 350×350×0.5 mm$^3$ and layer 3 of 320×320×5 to 10 mm$^3$. The difference in surface area is represented by edge 2A. Void 6 defined by edges 2A of sheet 2 of graphite foil which protrude beyond the edges of layer 3 of the solid phase change material can be filled when the volume of the phase change material increases upon phase change. Without providing such voids, the volume increase of the phase change material could result in bursting of the latent heat storage device.

Figure 2:
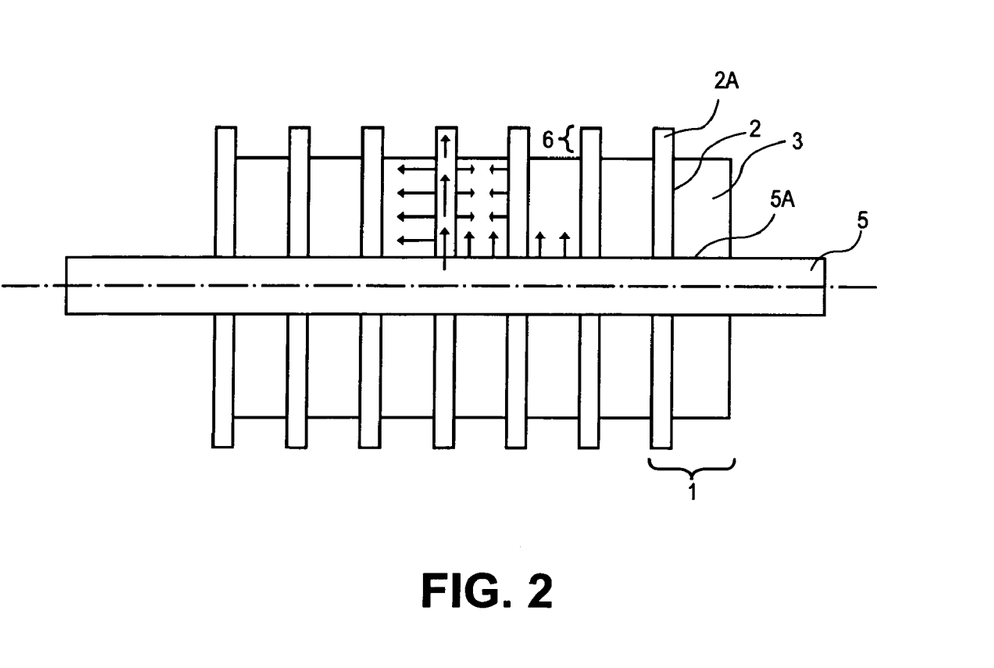
FIG. 2 is a diagrammatic sectional view of the arrangement of a plurality of latent heat storage laminates on a heat exchange tube.

FIG. 2 depicts the stack-like arrangement of a plurality of laminates 1 on heat exchange tube 5. Each laminate 1 may be arranged on tube 5 by inserting tube 5 through a through-hole in each laminate (e.g., through-hole 4 in laminate 1 in FIG. 1A and FIG. 1B). A medium from or to which heat is transferred, e.g., water, may pass through tube 5. A representative diameter of tube 5 is 10 to 50 mm with a tube length of 2 to 10 meters. In this embodiment, wall 5A of tube 5 forms the heat transfer interface. It is appreciated that the number of laminates on a heat exchange tube may vary depending on factors such as the length of tube 5 in a latent heat storage device, the desired thermal transfer, etc.

In those regions of PCM layer 3 which are close to wall 5A of tube 5, direct heat transfer between the phase change material and the heat exchange interface is facilitated by the small distances. On the other hand, for those regions of layer 3 of phase change material which are more remote from tube 5, sheets 2 of graphite foil provide thermally conductive junctions to the heat exchange interface. Heat transfer within the bulk of the phase change material has to occur only over the short distance of the half thickness of layer 3. Heat transfer is indicated by arrows in FIG. 2.

It is understood that a heat storage device according to this embodiment of the invention may contain a plurality of heat exchange tubes 5 with laminates 1 each formed of sheet 2 of graphite foil and layer 3 of a phase change material disposed thereon. It is also appreciated that more than one heat exchange tube 5 may be disposed through a laminate.

Laminates of graphite foil and phase change material such as laminates 1 can be obtained by defining edge 2A on sheet 2 and casting the liquid phase change material onto the surface of sheet 2 of graphite foil and allowing the phase change material to solidify, thus forming layer 3. A shown in FIG. 1A and FIG. 1B, a laminate is formed with layer 3 on sheet 2 leaving edge 2A free of phase change material. Transfer of the phase change material into the liquid state is achieved, e.g., by melting or by dissolution in a suitable solvent, which afterwards is evaporated from the laminate. The phase change material is applied in such an amount that within laminate 1, the volume fraction of sheet 2 of graphite foil is at most 20 percent, and, in one embodiment, below 10 percent. For example, sheet 2 of graphite foil having a thickness of 0.5 mm is coated with layer 3 of a phase change material having a thickness between 5 and 10 mm.

An advantage of the embodiment described with reference to FIGS. 1A, 1B and 2 is that due to the prefabrication of the laminates, no hot liquid phase change material has to be handled during assembly of the latent heat storage device.

The application of prefabricated laminates each formed of a sheet of graphite and a layer of a phase change material is not restricted to the embodiment with heat exchange tubes according to FIG. 2. In another embodiment, not illustrated in a figure, a stack comprising a plurality of laminates each formed of a sheet of graphite foil and a layer of a phase change material is arranged between heat exchanger plates in such a manner that the sheets of graphite foil are oriented perpendicular to the heat exchanger plates. In this arrangement, the laminates are not provided with central through-holes.

In those regions of the phase change material layers that are close to the heat exchanger plate, direct heat transfer between the phase change material and the heat exchanger plate is facilitated by the small distance. On the other hand, for those regions of the phase change material layer that are more remote from the heat exchanger plate, the sheets of graphite foil provide thermally conductive junctions to the heat exchanger plate. Heat transfer within the bulk of the phase change material has to occur only over the short distance of the half thickness of layer.

The sheets of graphite foil can be provided with a structure including projecting areas like knobs or buckles on at least one surface. Such optional projections act as spacers and prevent slipping of the sheets onto each other when the phase change material is in the liquid state. For instance the sheets of graphite foil (thickness 0.5 mm) are provided on one surface with knobs of 5 mm diameter and 5 mm height. The distance between the knobs is about 20 mm. FIG. 1B shows projections 8 (in dashed lines) protruding from a surface of sheet 2, the same surface onto which layer 3 of phase change material is cast. Within the heat storage device, the sheets are assembled in such way that the surface provided with the knobs is adjacent to the surface of the adjacent foil without phase change material cast into it.

Figure 3:
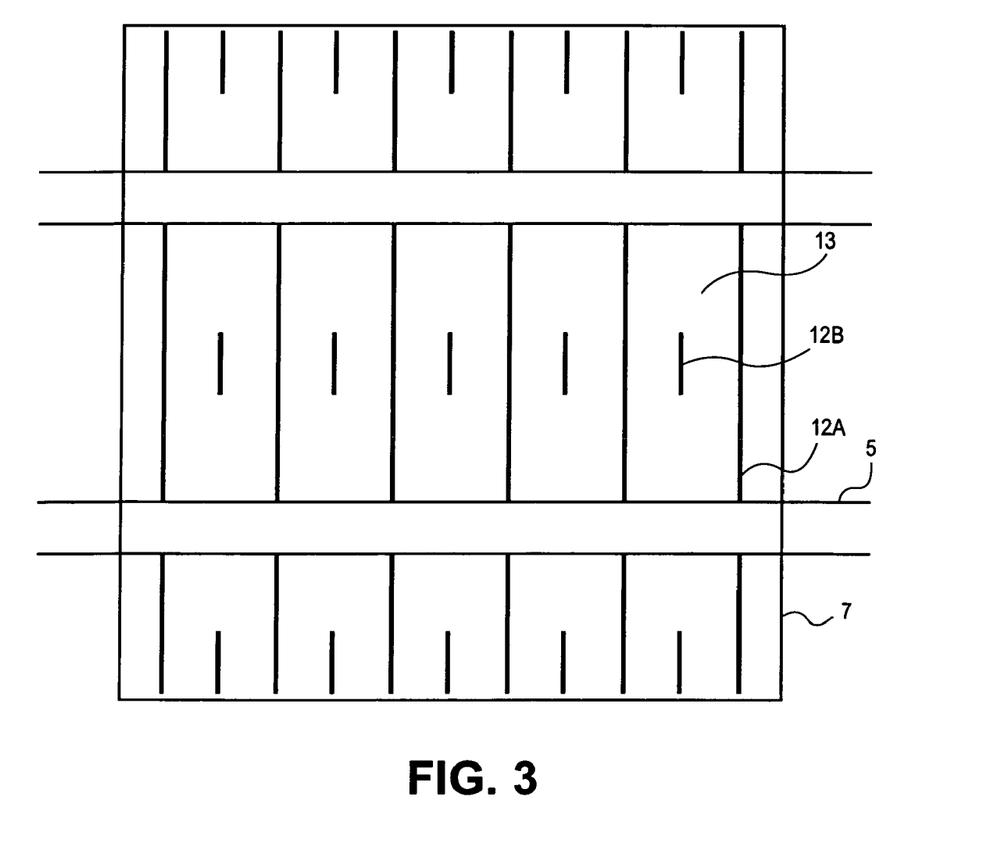
FIG. 3 is a diagrammatic sectional view of the arrangement of a plurality of sheets of graphite foil within a latent heat storage device.

According to another embodiment of the invention which is depicted in FIG. 3, a plurality of first sheets 12A of graphite foil is disposed on heat exchange tubes 5 and a plurality of second sheets 12B of graphite foil is arranged in such manner that they extend within the bulk of phase change material 13 without being in direct mechanical contact or connection to heat exchange tubes 5. Second sheets 12B of graphite foil which are not in contact with heat exchange tubes 5 can be fastened to the inner wall of vessel 7 surrounding the phase change material. The arrangement shown in FIG. 3 is advantageous because additional thermal conductivity is provided by sheets 12B in such regions of phase change material 13 which are rather remote from heat exchange tubes 5. Heat transfer within the bulk of the phase change material has to occur only over the short distance of the half thickness of the layers of PCM 13 between sheets 12A, 12B.

In the embodiment of FIG. 3, first sheets 12A are provided as continuous sheets extending over a plurality of heat exchange tubes 5. The sheets are provided with through-holes at the positions of tubes 5 (e.g., in FIG. 3, each first sheet 12A includes two through-holes for tubes 5). In another embodiment, instead of continuous sheets, a plurality of individual sheets of graphite foil with central through-holes can be arranged on each heat exchanging tube.

To assemble a heat storage device in vessel 7, first sheets 12A could be first fixed to tubes 5. The tubes are then installed in vessel 7. Alternatively, if first sheets 12A with smaller through holes and second sheets 12B with larger through holes are used, both types of sheets could first be fixed to vessel 7, then tubes 5 could be fed through vessel and through the through holes.

Although in FIG. 3, first sheets 12A are shown in a parallel arrangement relative to second sheets 12B, the invention is not restricted to this particular arrangement. Any arrangement of second sheets 12B in relation to first sheets 12A which provides an intensive penetration of the bulk of phase change material 13 by the sheets of graphite foil is suitable.

In one embodiment, first sheets 12A and second sheets 12B are added to vessel 7 and phase change material 13 is then poured into vessel 7 as a powder or bulk good or in the liquid state, if available. Voids in the vessel may be provided to allow for volume increase of the phase change material upon phase change. One way to form voids is by not completely filling the vessel with phase change material 13.

Alternatively, the embodiment of FIG. 3 can be obtained by arranging a plurality of the prefabricated laminates depicted in FIG. 1 within the vessel. To this end, a plurality of first prefabricated laminates provided with central through-holes is arranged on heat exchange tubes 5, and a plurality of second prefabricated laminates is arranged within vessel 7 in such a way that the sheets of graphite foil of these second plurality of laminates are not in contact with heat exchange tubes 5, but fastened to the inner wall of vessel 7.

Furthermore, the arrangement comprising a plurality of first sheets of graphite foil being in contact with a heat exchange interface and a plurality of second sheets of graphite foil extending within the bulk of the phase change material without being in contact with a heat exchange interface can be employed in a device provided with heat exchanger plates instead of heat exchange tubes. The first plurality of sheets of graphite foil is arranged relative to the heat exchanger plates in such a way that they extend from the plate surface into the bulk of the phase change material under an angle which is different from zero. The second plurality of sheets of graphite foil is arranged in such manner that they extend within the bulk of the phase change material without being in direct mechanical connection to the heat exchanger plates. Instead of sheets, prefabricated laminates each formed of a sheet of graphite foil and a layer of a phase change material can be used to assemble this embodiment. Voids should be provided to allow for volume increase of the phase change material upon phase change.

Figure 4:
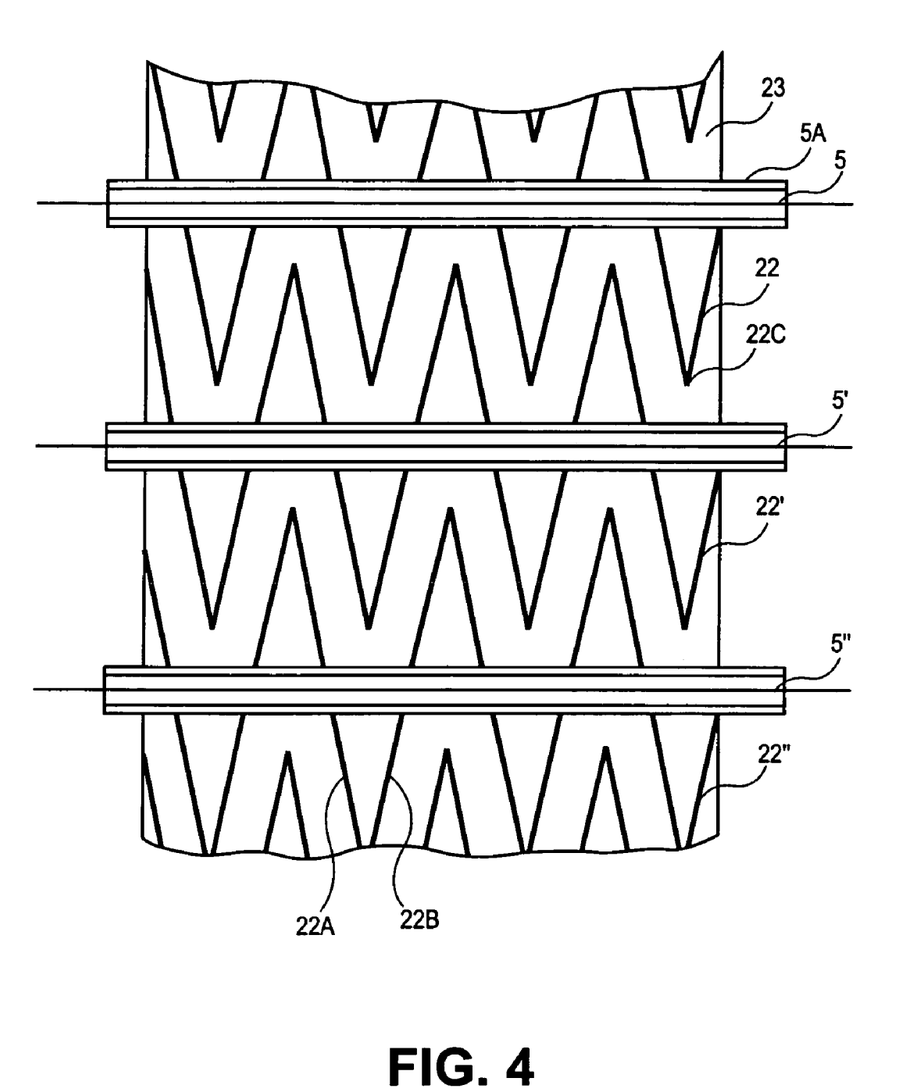
FIG. 4 is a diagrammatic sectional view of the arrangement of a plurality of folded sheets of graphite foil within a latent heat storage device according to another embodiment.

FIG. 4 shows another embodiment of a latent heat storage device according to an embodiment of the invention. In this embodiment, sheet 22 of graphite foil is folded in a zig-zag manner. Sections 22A, 22B . . . of the zig-zag folded sheet 22 are provided with aligned through-holes allowing the folded sheet to be arranged on heat exchange tube 5. Due to the zig-zag folding of sheet 22, the graphite foil extends from the wall 5A of tube 5 under an angle which is different from 0.

The latent heat storage device of FIG. 4 includes a vessel that contains a plurality of heat exchange tubes 5, 5', 5" . . . each with zig-zag folded sheet 22, 22', 22" . . . etc. of graphite foil disposed thereon. The space surrounding heat exchange tubes 5, 5', 5" . . . and sheets 22, 22', 22" . . . in the vessel contains phase change material 23. Sheets 22, 22', 22" . . . on tubes 5, 5', 5" . . . are arranged, in one embodiment, with respect to each other in such way that apexes 22C of the folding of first sheet 22 protrude into the openings of the folding of next sheet 22'. In other words, the apexes and valleys of each sheet are directionally aligned. This arrangement allows for an intensive penetration of the bulk of the phase change material by the graphite foil.

In those regions of the phase change material 23 that are close to one of heat exchange tubes 5, 5', 5" . . . , direct heat transfer between phase change material 23 and wall 5A of the heat exchange tube is facilitated by the small distance. On the other hand, for those regions of the phase change material layer which are more remote from the heat exchange tubes, a sheet of graphite foil provides thermally conductive junctions to the heat exchange tubes. Heat transfer within the bulk of the phase change material has to occur only over the short distance of the half thickness of the layers 23 of phase change material between sheets 22A, 22B.

In one embodiment, the phase change material is poured into the vessel as a powder or bulk good or in the liquid state, if available. Voids should be provided to allow for volume increase of the phase change material upon phase change, for example, by filling the V-shaped openings in a folded sheet only partially.

Alternatively a composite comprising sheet 22 of graphite foil and phase change material 23 is prefabricated by casting the liquid phase change material into the V-shaped openings of folded sheet 22 and allowing phase change material 23 to solidify. Voids should be provided to allow for volume increase of the phase change material upon phase change, for example, by providing excess free space between the prefabricated composite and the vessel wall.

To assemble pre-fabricated composites in a vessel after solidification of phase change material 23, holes could be drilled into the composites to allow for shifting through heat exchange tubes 5. Alternatively, the through holes for the heat exchanger tubes in the foil could be provided before casting the liquid phase change material onto the foil, for example, by punching. Spacers should be placed at the positions of the holes before casting the phase change material onto the foil to prevent the liquid phase change material from filling the space that will represent the through hole for the heat exchanger tubes. After casting the liquid phase change material onto the foil and allowing for solidification of the phase change material, the spacers should be removed. Such prefabricated composites containing through holes for heat exchanger tubes could be fixed to heat exchanger tubes and then be installed in a vessel.

Such prefabricated composites could also be used in a device with heat exchange plates instead of tubes. The composite can be disposed between the plates so that the zig-zag folded sheet extends between two heat exchanger plates.

Instead of being folded in a zig-zag manner, sheets 22, 22', 22" . . . of graphite foil disposed on heat exchange tubes 5, 5', 5" . . . can be corrugated like corrugated iron sheet.

Figure 5:
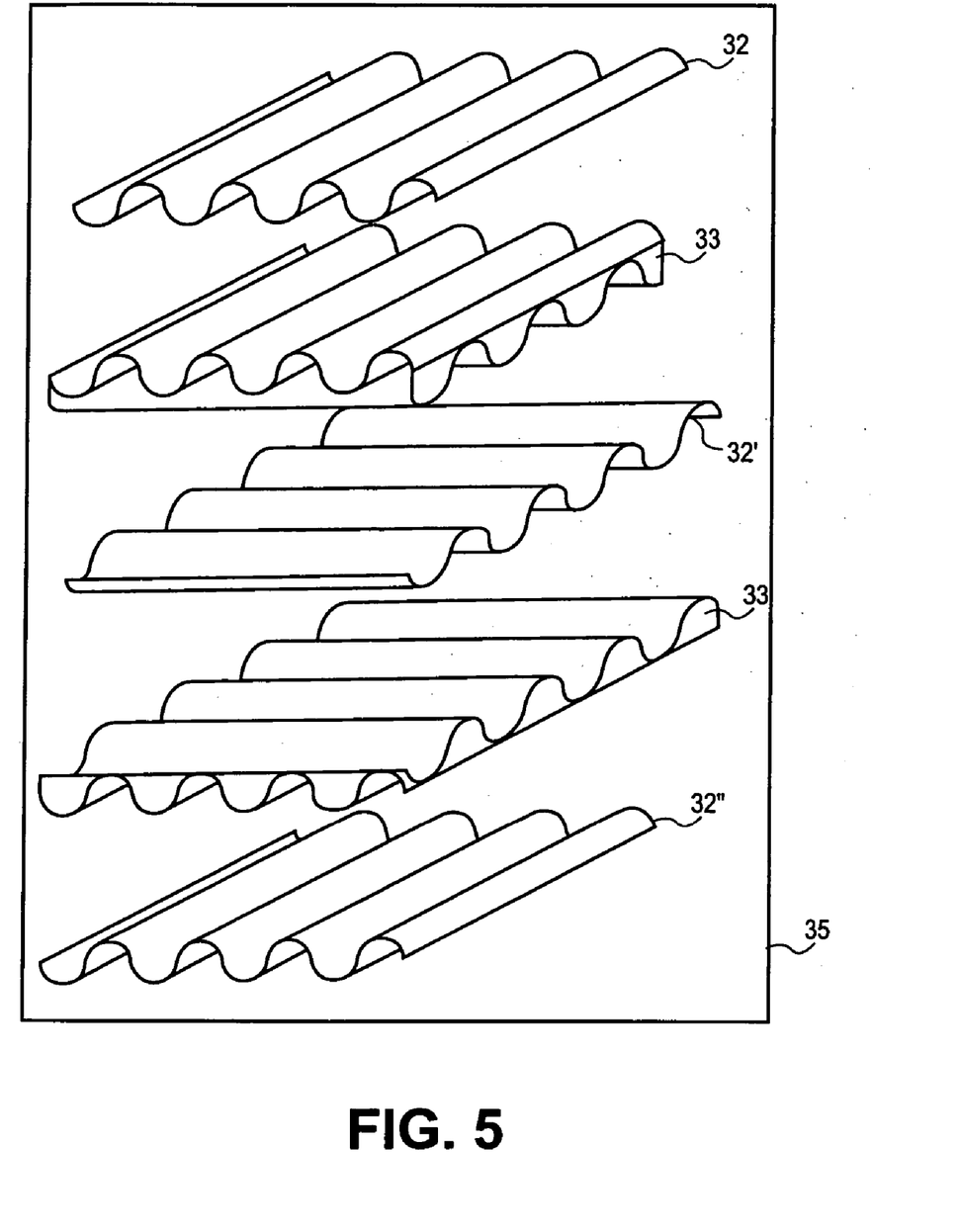
FIG. 5 is a diagrammatic view of the arrangement of a plurality of corrugated sheets of graphite foil within a latent heat storage device according to another embodiment.

FIG. 5 shows a diagrammatic exploded view of an arrangement of a plurality of corrugated sheets 32, 32', 32" . . . of graphite foil stacked one on top of the other within latent heat storage device 35 according to another embodiment. Layers 33, 33', . . . etc. of phase change material are disposed between adjacent sheets 32, 32', 32", . . . etc., respectively. In the embodiment shown in FIG. 5, the sheets are arranged in such way that the direction of corrugation of first sheet 32 is rotated by 90° relative to the direction of corrugation of the next sheet 32'. Due to this orthogonal orientation of the corrugation of adjacent sheets, slipping of the corrugated sheets into each other when the phase change material is in the liquid state is inhibited. In contrast, there is always left certain space between adjacent sheets 32, 32' which can accommodate phase change material 33.

A similar arrangement can be formed with zig-zag folded sheets stacked upon each other in such way that the direction of folding of a first sheet is rotated by 90° relative to the direction of folding of the next sheet.

The embodiment of FIG. 5 can be used with heat exchange tubes penetrating through the sheets of graphite foil 32, 32', 32" . . . and the layers of PCM 33, 33', 33" . . . in-between. Alternatively, the stack comprising a plurality of sheets 32, 32', 32" . . . of graphite foil with layers 33, 33', 33" . . . of phase change material in-between, respectively, can be assembled between heat exchanger plates.

Prefabricated composites comprising a plurality of sheets of graphite foil stacked upon each other in such way that the direction of corrugation or folding of a first sheet is rotated by 90° relative to the direction of corrugation and folding of the next sheet with layers of phase change material in-between can be made by stacking the sheets onto each other, casting the liquid phase change material into the space between the sheets of graphite foil and allowing the phase change material to solidify. Voids should be provided to allow for volume increase of the phase change material upon phase change.

In a further embodiment of a latent heat storage device, a plurality of capsules containing phase change material is disposed in a vessel which contains a medium from or to which heat is to be transferred. In this embodiment, the heat exchange interface is formed by the walls of the capsules. Due to the distribution over the plurality of capsules, a relatively large heat exchange interface is formed.

In accordance with an embodiment of the invention, sheets of graphite foil which extend within the bulk of the phase change material can be provided within the capsules. Voids should be provided within the capsules to allow for volume increase of the phase change material upon melting. The need of providing voids is obviated when an elastic capsule wall is provided which can cope with the volume increase. A suitable material for such an elastic capsule wall is plastic-foil with vapor-deposited aluminum.

In the capsules, the volume fraction of the sheets of graphite foil within the overall volume of graphite foil and phase change material can be limited to at most 20%, preferably below 10%.

Figure 6:
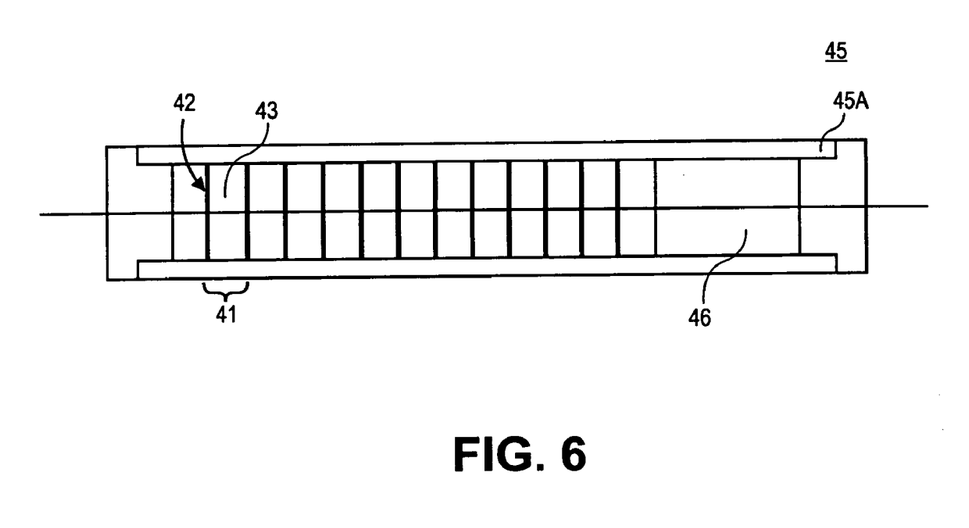
FIG. 6 is a diagrammatic sectional view of a capsule containing a phase change material and a plurality of sheets of graphite foil according to another embodiment.

According to the embodiment of the invention which is shown in FIG. 6, within such capsules 45 a plurality of laminates 41 each formed of sheet 42 of graphite foil and layer 43 of a phase change material can be disposed. Preparation of such laminates may be as described in accordance with the laminates of FIG. 1. Layer 43 of phase change material has a thickness between 5 and 10 mm.

Sheets 42 of graphite foil facilitate heat transfer from those regions of layers 43 of phase change material that are remote from wall 45A of the capsule. Heat transfer within the bulk of the phase change material has to occur only over the short distance of the half thickness of layer 43.

In the capsule shown in FIG. 6, volume of capsule 45 is not completely filled with laminates 41. Void 46 is left to allow for volume increase of the phase change material upon phase change. Alternatively, voids can be provided in a similar manner as shown in FIG. 2 by dimensioning the surface area of sheet 42 of graphite foil larger than the surface area of layer 43 of phase change material in the solid state so that voids are defined by the edges of sheets 42 of graphite foil which protrude above the edges of the layer. Without providing such voids, the volume increase of the phase change material could result in bursting of the capsule.

The need of providing voids is obviated when an elastic capsule wall is provided which can cope with the volume increase. A suitable material for such an elastic capsule wall is plastic-foil with vapor-deposited aluminum.

Alternatively, composites comprising a folded or corrugated sheet of graphite foil and the phase change material are prefabricated and disposed within capsules so that the folded or corrugated sheet extends from a first wall of the capsule to the opposite wall. In one embodiment, the composites are prefabricated by casting the liquid phase change material into the openings of the folded or corrugated sheet and allowing the phase change material to solidify.

Figure 7A:
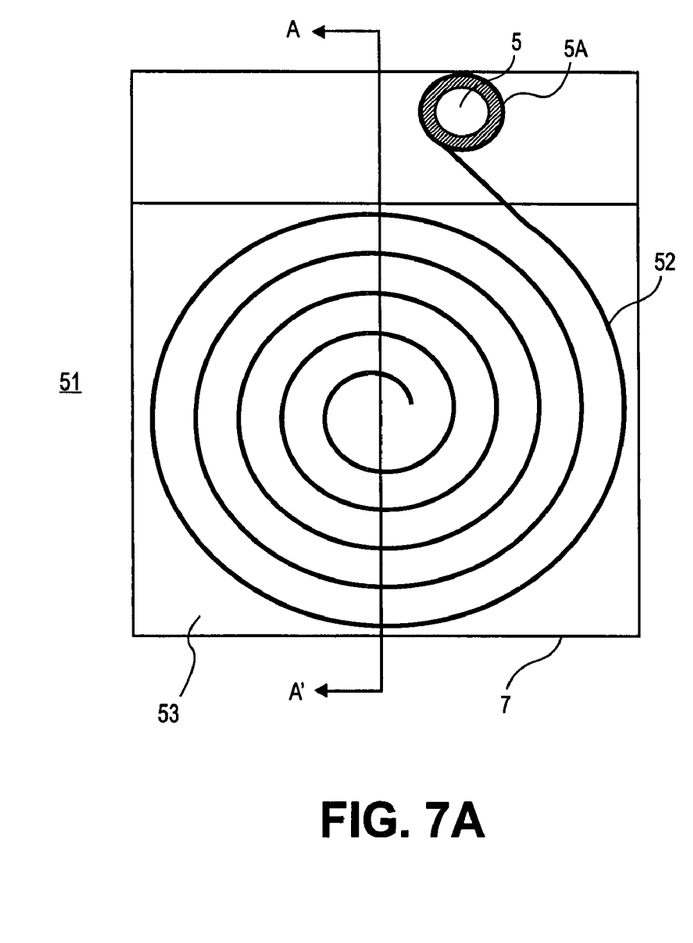
FIG. 7A is a schematic side view of a vessel having a coiled sheet of graphite coated with a phase change material.
Figure 7B:
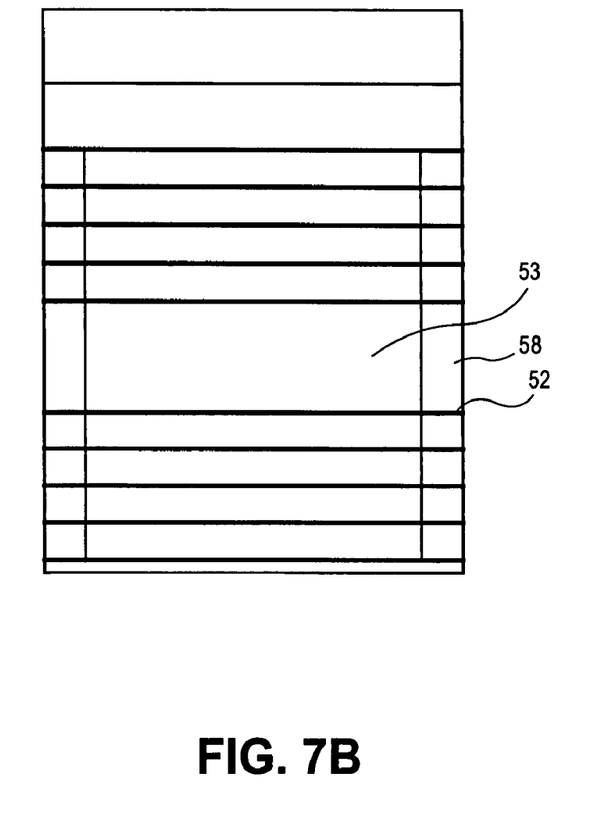
FIG. 7B shows a cross-sectional side view of the vessel of FIG. 7A through line A-A'.

FIG. 7A and FIG. 7B show another embodiment of the invention including coil 51 (e.g., a coiled sheet) of graphite foil 52. FIG. 7A shows a side view of a vessel including the coiled sheet of graphite foil coated with phase change material 53 and FIG. 7B shows a cross-sectional view of the container through line A-A'. FIG. 7A and FIG. 7B show sheet of graphite foil 52 coated with phase change material 53 in the form of coil 51. As shown in FIG. 7A, an end of sheet of graphite foil 52 which is not coated with phase change material 53 provides a heat-conducting junction to a heat exchange interface, e.g., wall 5A of tube 5 wherein a heat transfer medium flows. To avoid leakage of phase change material 53 when it is in the liquid state, coil 51 is disposed in a vessel 7 filled with phase change material 53. Coil 51 is confined by lateral spacers 58. The spacers might contain apertures to allow for the volume increase of phase change material 53 upon phase change. Of course, a plurality of coils 51 can be disposed in thermal conductive junction to a heat exchange interface. In one embodiment, coil 51 is obtained by coating a sheet of graphite foil with a layer of a phase change material in the liquid state and subsequent coiling up of the coated sheet. The thickness of the phase change material can vary, depending on the radius of the coil.

In each of the embodiments described herein, the graphite foil might be provided with perforations allowing flow-through of the molten phase change material. In this way, mechanical tensions arising from the sudden volume increase upon melting of the phase change material are reduced or avoided. One way to provide perforations in the foil is by needling the foil with a spiked roller. Alternatively, perforations could be formed by punching or rotation cutting. In a typical application, a foil will have voids.

Figure 8:
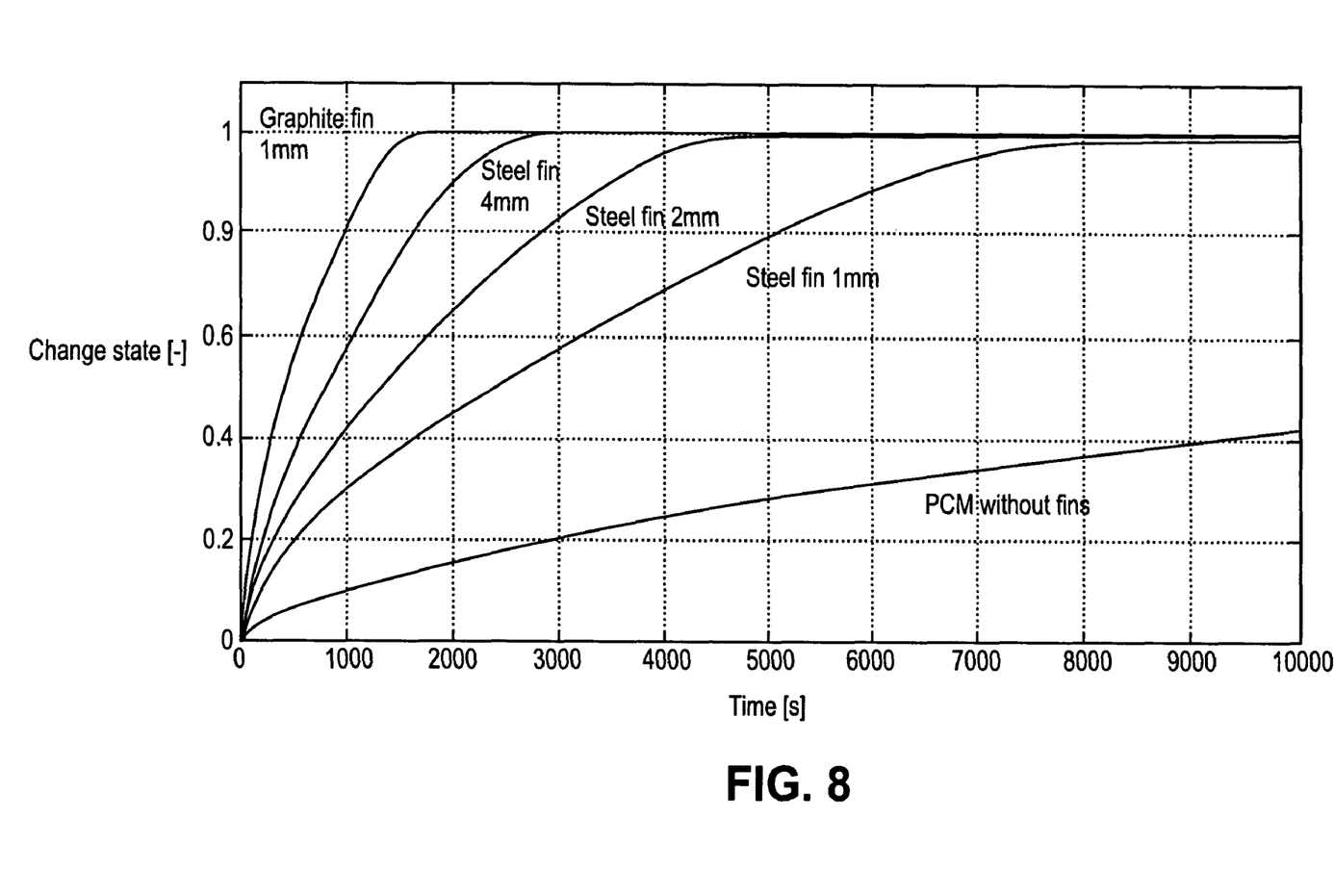
FIG. 8 shows a graphical representation of the charging time of phase change material in the presence of graphite foil and steel fins.

As noted above, graphite foil is very qualified for the directional transfer of heat. FIG. 8 shows a diagram of the time needed for charging (complete conversion of a phase change material) for heat storage devices including, heat conductors of graphite foil fins, steel fins of varying thickness and without any heat conducting fin. FIG. 8 shows that graphite foil perform significantly better than the steel fins. The simulation was carried out using a eutectic mixture of sodium nitrate/potassium nitrate ($NaNO_3/KNO_3$) and is valid for a tube array comprising 12 tubes with an outer diameter of 12 mm. A thickness of the phase change layer is 8 mm.

Other features which are considered as characteristic for the invention are set forth in the appended claims.

It is understood that the invention is not intended to be limited to the details given, since various modifications and structural changes may be made therein without departing from the spirit of the invention and within the scope and range of equivalents of the claims.

In this respect, it has to be noted that—although described with respect to latent heat storage using phase change materials—the invention can also be adopted to devices for storage of sensible heat.

We claim:

1. A latent heat storage device comprising
    a vessel;
    at least one non-circulated phase change material disposed within the vessel, the phase change material being selected from the group consisting of paraffin, thermoplastic polymers, organic acids, aqueous solutions of salts, chlathrate hydrates, salt hydrates, mixtures of salt hydrates, salts and eutectic blends of salts and alkali metal hydroxides;
    a plurality of sheets of graphite foil which extend within a bulk of the phase change material, said plurality of sheets of graphite foil being arranged within said phase change material to define a laminate structure with alternating layers of said graphite foil and said phase change material; and
    at least one heat exchange interface extending transverse to the laminate structure and in heat transfer relationship with each of the plurality of sheets of graphite foil and phase change material.

2. The latent heat storage device of claim 1, wherein the at least one heat exchange interface is formed by one of a wall of a heat exchange tube passed through a heat transfer medium, and a plate over which a heat transfer medium flows.

3. The latent heat storage device of claim 1, wherein a volume fraction of the plurality of sheets of graphite foil within the overall volume of graphite foil and phase change material in the heat storage device is at most 20%.

4. The latent heat storage device of claim 1, wherein the plurality of sheets of graphite foil have a sheet thickness in the range between 0.1 and 3 mm, a density in the range between 0.5 and 1.9 $g/cm^3$, and an in-plane thermal conductivity of at least 70 W/m*K.

5. The latent heat storage device of claim 1, wherein the phase transition temperature of the phase-change material is in the range from −100° C. to +500° C.

6. The latent heat storage device of claim 1, wherein at least one of the plurality of sheets of graphite foil is provided with a plurality of perforations each perforation allowing flow-through of the phase change material in a liquid phase.

7. The latent heat storage device of claim 1, wherein at least one of the plurality of sheets of graphite foil comprises projecting areas on at least one surface.

8. The latent heat storage device of claim 1, wherein at least one of the plurality of sheets of graphite foil is fastened to the at least one heat exchange interface and projects into the bulk of the phase change material so that the angle between the heat exchange interface and the at least one sheet of graphite foil is different from zero.

9. The latent heat storage device of claim 8, wherein the at least one sheet of graphite foil is oriented perpendicularly to the heat exchange interface that the at least one sheet of graphite foil is fastened to.

10. The latent heat storage device of claim 1, wherein at least one of the plurality off sheets of graphite foil extends within a bulk of the phase change material without being in contact with a heat exchange interface.

11. The latent heat storage device of claim 10, wherein the at least one sheet of graphite foil is not in contact with a heat exchange interface and is fastened to an inner wall of the vessel surrounding the phase change material.

12. The latent heat storage device of claim 1, wherein
    a first plurality of sheets of graphite foil are fastened to the heat exchange interfaces and project into the bulk of the phase change material so that the angle between a heat exchange interface and a sheet of graphite foil is different from 0; and
    a second plurality of sheets of graphite foil extend within the bulk of said phase change material without being in contact with a heat exchange interface.

13. The latent heat storage device of claim 1, wherein a plurality of capsules are disposed in the vessel, each of the plurality of capsules comprising the phase change material and sheets of graphite foil extend within the bulk of the phase change material.

14. A latent heat storage device comprising:
    a vessel;
    at least one non-circulated phase change material disposed in the vessel, the phase change material being selected from the group consisting of paraffin, thermoplastic polymers, organic acids, aqueous solutions of salts, chlathrate hydrates, salt hydrates, mixtures of salt hydrates, salts and eutectic blends of salts and alkali metal hydroxides;
    a plurality of sheets of graphite foil disposed within the vessel and in thermal communication with the phase change material, said plurality of sheets of graphite foil being arranged within said phase change material to define a laminate structure with alternating layers of said graphite foil and said phase change material; and
    at least one heat exchange interface extending transverse to the laminate structure and in heat transfer relationship with each of said plurality of sheets of graphite foil and phase change material.

15. The latent heat storage device of claim 14, wherein the heat exchange interface is in contact with each of the phase change material and the plurality of sheets of graphite foil.

16. The latent heat storage device of claim 15, wherein the heat exchange interface is in contact with the plurality of sheets of graphite foil.

17. A composite comprising a sheet of graphite foil and a layer of a phase change material forming a laminate, the laminate having a through-hole allowing it to be arranged on a heat exchange tube and the phase change material being selected from the group consisting of organic acids, aqueous solutions of salts, chlathrate hydrates, salt hydrates, mixtures of salt hydrates, salts and eutectic blends of salts and alkali metal hydroxides.

18. A composite comprising a sheet of graphite foil and a layer of a phase change material forming a laminate, the phase change material being selected from the group consisting of organic acids, aqueous solutions of salts, chlathrate hydrates, salt hydrates, mixtures of salt hydrates, salts and eutectic blends of salts and alkali metal hydroxides, the composite being configured to be positioned within a heat storage device and a surface area of the sheet of graphite foil is larger than a surface area of the layer comprising the phase change material in the solid state such that voids are defined by a distance between an edge of the sheet of graphite foil and an edge of the layer of the solid phase change material.

\* \* \* \* \*